J. N. TAYLOR.
DRAFT EQUALIZER.
APPLICATION FILED FEB. 27, 1909.

947,564.

Patented Jan. 25, 1910.
2 SHEETS—SHEET 1.

Witnesses
J. H. Crawford

Inventor
John N. Taylor,
By
Attorneys

J. N. TAYLOR.
DRAFT EQUALIZER.
APPLICATION FILED FEB. 27, 1909.

947,564.

Patented Jan. 25, 1910.

2 SHEETS—SHEET 2.

Witnesses
J. H. Crawford

Inventor
John N. Taylor,
By Chandler & Chandler
Attorneys

UNITED STATES PATENT OFFICE.

JOHN N. TAYLOR, OF DURAND, ILLINOIS.

DRAFT-EQUALIZER.

947,564.  Specification of Letters Patent.  Patented Jan. 25, 1910.

Application filed February 27, 1909. Serial No. 480,331.

*To all whom it may concern:*

Be it known that I, JOHN N. TAYLOR, a citizen of the United States, residing at Durand, in the county of Winnebago, State of Illinois, have invented certain new and useful Improvements in Draft-Equalizers; and I do hereby declare the following to be a full, clear, and exact description of the invention, such as will enable others skilled in the art to which it appertains to make and use the same.

The invention relates to draft eveners or equalizers and more particularly to the class of three horse draft equalizers.
The primary object of the invention is the provision of an equalizer of this character in which means is employed for equalizing, limiting, and regulating the draft upo nthe several swingle trees to which the draft animals are to be hitched.

Another object of the invention is the provision of a draft equalizer in which the same may be attached to a draft pole of a vehicle or other like means at the will of the person, and one that will equalize, limit and regulate the draft upon the several animals hitched thereto so that no one animal will be pulling in excess of the other animals.

Another object of the invention is the provision of a draft equalizer of this character which is simple in construction, durable, and inexpensive in the manufacture.

With these and other objects in view the invention consists in the construction, combination and arrangement of parts as will be hereinafter specifically described, illustrated in the accompanying drawings which disclose the preferred form of embodiment of the invention, and as brought out in the claim hereunto appended.

Figure 1:
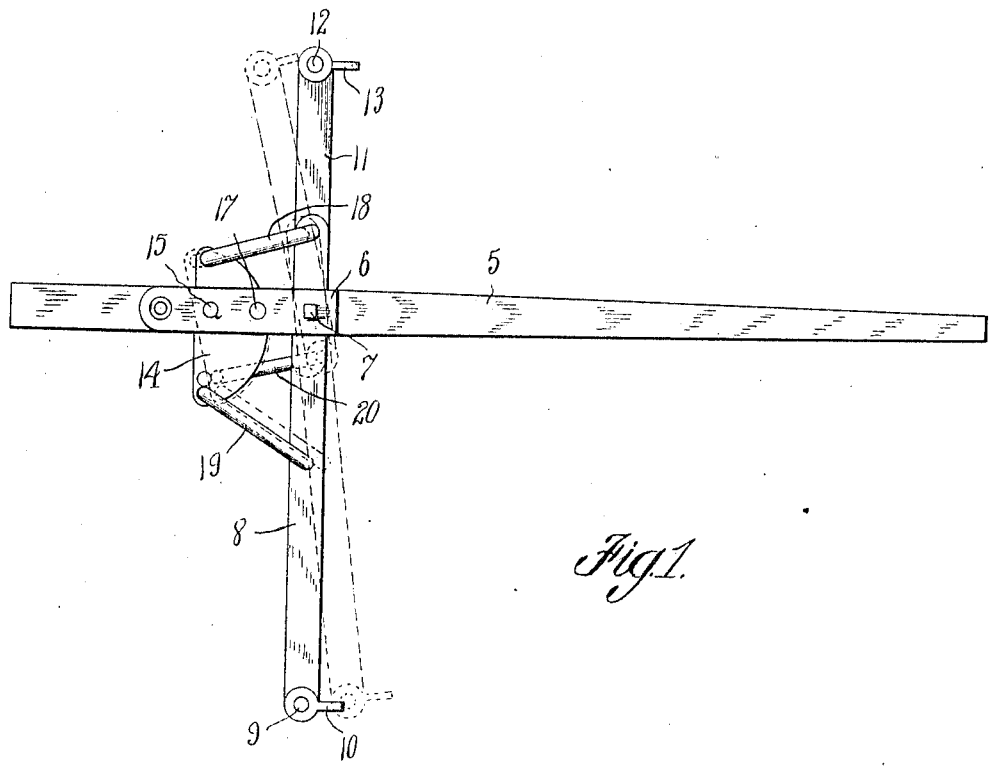
Figure 4:
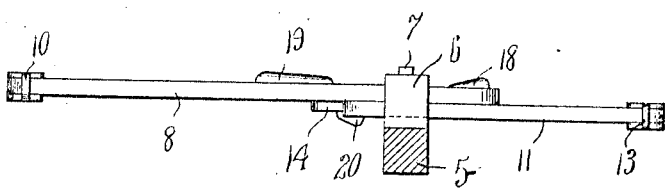
Figure 2:
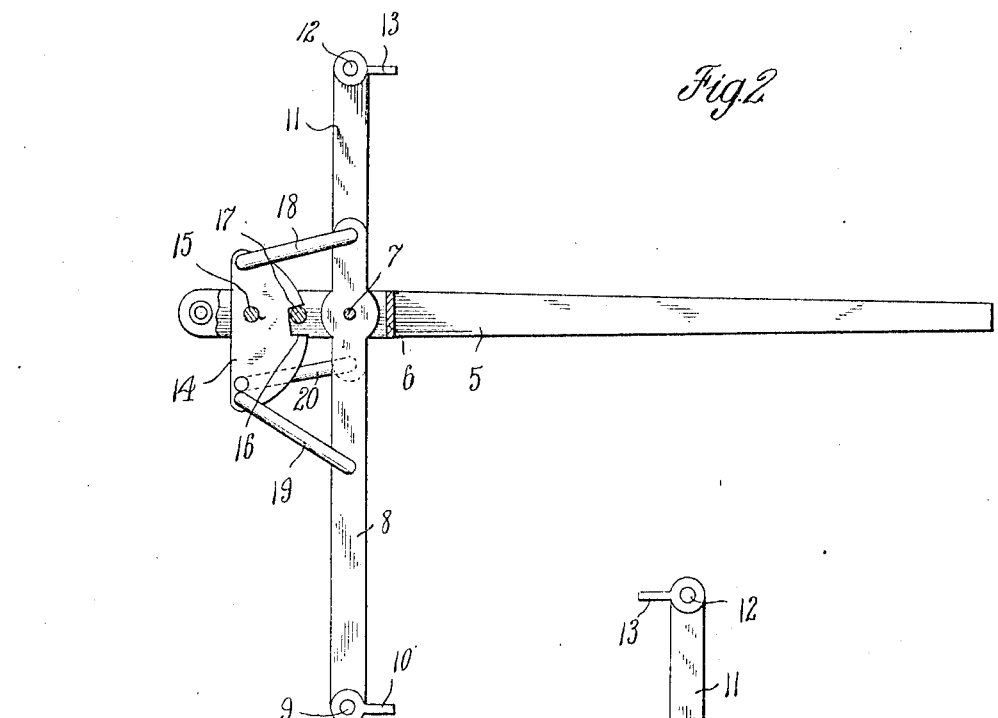
Figure 3:
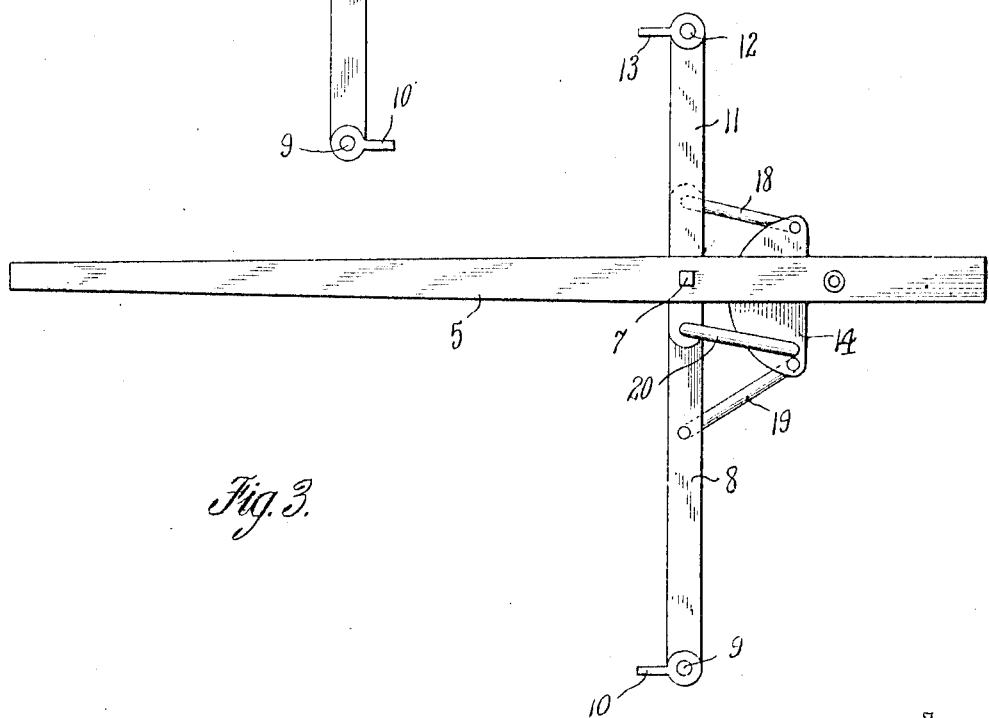

In the drawings:—Figure 1 is a top plan view of the invention showing in dotted lines a shifted position thereof. Fig. 2 is a similar view with the loop bracket broken away.
Fig. 3 is a bottom plan view. Fig. 4 is a front elevation with a tongue shown in sections.

Similar reference characters indicate corresponding parts throughout the several views of the drawings.

In the drawings the numeral 5 designates a tongue or draft pole which is of the usual or ordinary construction and upon which is mounted near its rear end a loop bracket 6, the latter being disposed upon the upper face of the tongue or draft pole.

Connected in the bracket 6, by a pivot pin 7, is an evener bar or beam 8, the pivot pin being located a slight distance removed from the inner end of said evener beam or bar and the outer end of the latter has mounted thereon by a pivot 9, a clip 10, the latter adapted for swinging movement and to which is connected an ordinary swingle tree (not shown) for the attachment of draft animals.

Beneath the evener beam or bar 8, at its inner end and connected for swinging movement to the pivot pin 7, is a lever or beam 11, which latter is of considerably less length than the said evener beam or bar and its connection with the pivot pin is located a slight distance removed from the inner end of the said beam 11, and to the outer end of the latter is pivotally connected as at 12, a swinging clip 13, to which is adapted to be connected a double tree having swingle trees (not shown) of the usual and well known construction for the attachment of a pair of draft animals thereto.

Directly in rear of the pivot pin connection 7, of the evener bar 8, and lever 11, within the bracket 6, is mounted a segment shaped equalizer plate 14, eccentrically mounted for swinging movement in the bracket by a pivot pin 15, and which plate at its arcuate shaped edge is formed with an elongated notch 16, and in the path of which is disposed a stop lug or pin 17, which latter serves to limit the swinging movement of said equalizer plate.

To one end of the equalizer plate 14, is pivotally connected one extremity of a rigid link 18, the opposite end of which is pivotally connected to the inner extremity of the evener bar or beam 8, and to the opposite end of the plate 14, is also pivotally connected the inner extremity of a rigid link 19, the latter having its other end pivotally connected to the evener beam of bar 8, a considerable distance removed from the pivot pin 7, and on the opposite side of the tongue or pole 5, with respect to the other link connected to the evener beam.

Pivotally connected to the equalizer plate 14, adjacent the connection of the link 19, is the inner end of a rigid link 20, the latter having its opposite end pivotally connected to the inner extremity of the lever 11, and by these link connections any movement of the lever will impart simultaneous movement to the evener beam or bar or vice versa.

While the equalizer has been shown and described as applied to a tongue or pole it is to be understood of course that the same may be mounted or applied to implements, wheel vehicles and the like, without the use of a pole or tongue.

It is thought the operation will be clearly apparent from the foregoing description and therefore a fuller or more extensive description is deemed unnecessary and has been omitted.

What is claimed is:—

The combination of a yoke bracket having spaced upper and lower parallel arms, of evener beams having their inner ends overlapping each other and disposed between the arms of the bracket, a common pivot connecting the inner ends of the beams to the bracket between its arms, a segment eccentrically pivoted in rear of the evener beams between the arms of the brackets and containing an elongated notch in its forward edge, a pin fixed between the arms of the brackets and engaging the notch, links pivoted to one of the evener beams at points on opposite sides of the pivot connecting it with the other beam and also pivotally connected to opposite ends of the segment, and a link pivotally connected to the inner end of the remaining evener beam and also to the segment.

In testimony whereof, I affix my signature, in presence of two witnesses.

JOHN N. TAYLOR.

Witnesses:
    NILES PATTERSON,
    EDWARD NELSON.